United States Patent [19]

Kuhn

[11] 4,442,660
[45] Apr. 17, 1984

[54] HIGH LIFT MECHANISM FOR REAR END OF FRONT MOUNTED MOWER

[75] Inventor: John B. Kuhn, Mayville, Wis.

[73] Assignee: Deere & Company, Moline, Ill.

[21] Appl. No.: 412,733

[22] Filed: Aug. 30, 1982

[51] Int. Cl.³ ............................................ A01D 35/26
[52] U.S. Cl. ................. 56/15.9; 56/DIG. 22
[58] Field of Search ...................... 56/15.9, 15.2, 15.8, 56/DIG. 22, 15.3, 16.2

[56] References Cited

U.S. PATENT DOCUMENTS

| | | | |
|---|---|---|---|
| 3,757,596 | 9/1973 | McCanse | 74/491 |
| 4,102,114 | 7/1978 | Estes et al. | 56/15.2 |
| 4,313,295 | 2/1982 | Hansen et al. | 56/15.9 |

*Primary Examiner*—Jay N. Eskovitz

[57] ABSTRACT

A front-mounted rotary mower is coupled to a vehicle by a pair of vertically swingable lift arms coupled between the vehicle and mounting brackets located in a central portion of the mower blade housing. A lift mechanism includes a pair of linkages respectively coupled between the pair of lift arms and the rear of the blade housing. Each linkage includes one link which carries a roller at one end disposed for engagement with the vehicle frame as the lift arms are swung upwardly, which action causes the one link to pivot to effect elevation of the rear end of the housing.

3 Claims, 2 Drawing Figures

HIGH LIFT MECHANISM FOR REAR END OF FRONT MOUNTED MOWER

BACKGROUND OF THE INVENTION

The present invention relates to front-mounted rotary mowers and more specifically relates to lift mechanisms for suspending such mowers.

Typically, front-mounted rotary mowers are either mounted to a vehicle by a pair of links coupled between the vehicle and the rear of the mower blade housing or by a pair of links which is connected between the vehicle and the blade housing at a central location thereof between its front and rear. In the former mounting, a lift linkage is coupled between the vehicle and a central location of the housing while in the latter mounting the pair of links also forms a lift linkage. Both types of mountings suffer from the disadvantage that when the mower is raised for transport, the rear end of the blade housing remains relatively close to the ground and often is not sufficiently high to clear obstacles, such as street curbs and the like, when the vehicle is being driven to and from mowing sites surrounded by such curbs.

SUMMARY OF THE INVENTION

According to the present invention, there is provided a novel suspension for a front-mounted rotary mower.

The objects of the invention set forth below are accomplished by a suspension comprising a pair of powered lift arms connected between the vehicle and a central location of the blade housing between front and rear ends of the latter. A high lift mechanism is connected between each lift arm and a rear location of the housing and includes a first link pivoted medially of its ends to the associated lift arm. A second link has its opposite ends connected to a lower end of the first link and the housing. An upper end of the first link is provided with a roller positioned so as to come into engagement with an undersurface of the vehicle frame, when the left arms are raised, so as to cause rotation of the first link and consequently effect lifting of the rear end of the blade housing.

A broad object of the invention is to provide a mower suspension for a front-mounted mower which operates to raise the mower blade housing sufficiently high for clearing obstacles such as street curbs.

A more specific object is to provide a front-mounted mower suspension wherein the lift arms form the sole connection of the mower with the vehicle and to provide a high lift mechanism connected between each lift arm and the rear end of the mower housing so as to lift the rear end of the housing in response to elevation of the lift arms.

These and other objects will become apparent upon reading the ensuing description together with the appended drawing.

DESCRIPTION OF THE PREFERRED EMBODIMENT

Figure 1:
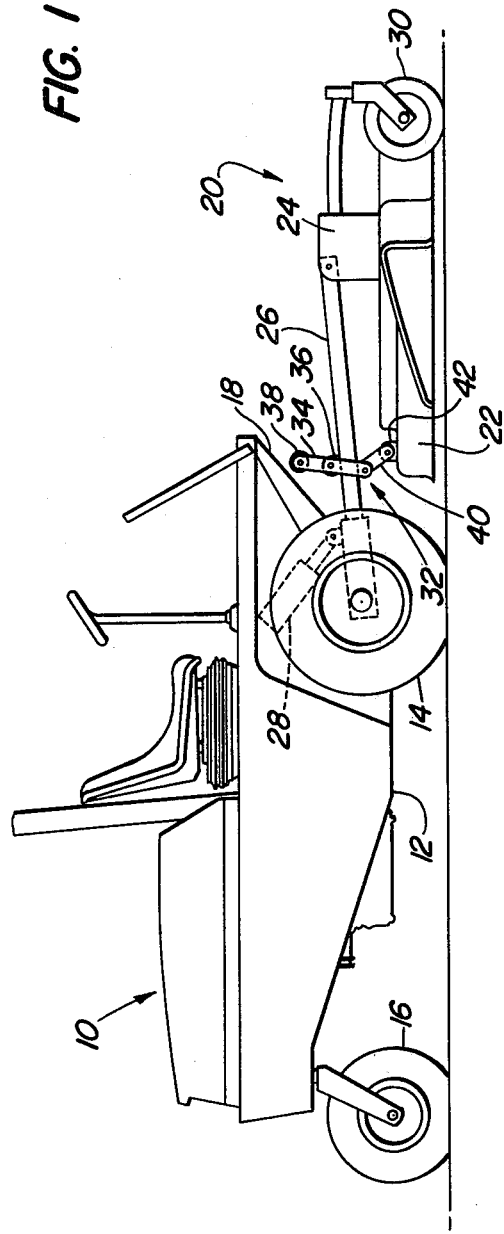
FIG. 1 is a right side elevational view of a front-mounted mower showing the mower in a lowered working position.

Preliminarily, it is to be noted that various elements described hereinafter will be described as occurring in pairs, however, only one of each pair is shown in the drawing.

Referring to the drawing, there is shown a tractor 10 of a tricycle type including a main frame 12 supported by a pair of driven front wheels 14 and a rear caster-mounted wheel 16. The forward underside of the frame 12 is defined by a forwardly and upwardly inclined surface 18, the significance of which will become apparent from the following description.

Figure 2:
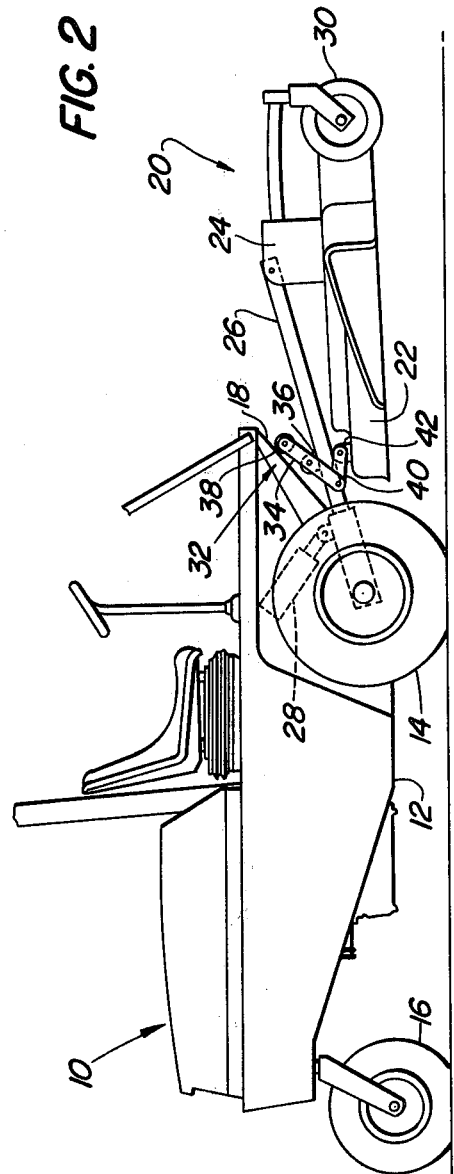
FIG. 2 is a view like that of FIG. 1 but showing the mower in a raised transport position.

Mounted on the forward end of the tractor 10 is a rotary lawn mower 20. Specifically, the mower includes a blade housing 22 having a pair of upright mounting plates or brackets 24 fixed thereto. A pair of lift arms 26 have rearward ends mounted to the tractor 10 for swinging vertically about an axis which is coincident with the axis of rotation of the driven wheels 14 and have forward ends respectively pivotally connected to the mounting plates 24. A pair of extensible and retractable hydraulic lift actuators 28 is connected between the frame 12 and the pair of lift arms 26 and is operable for moving the lift arms 26 between lowered and raised positions for respectively disposing the mower 20 in working and transport positions respectively shown in FIGS. 1 and 2.

When the mower 20 is in its working position, the forward end of the housing 22 is maintained at a desired cutting height by a pair of caster wheels 30 while the rearward end thereof is maintained at a corresponding height by a pair of support mechanisms (not shown) connected between the lift arms 26 and the rear end of the housing 22.

The present invention resides in a pair of lift mechanisms 32 which are respectively connected between the pair of lift arms and the rear end of the housing 22. Specifically, the mechanisms 32 each include a first link 34 pivoted medially of its ends to a lug 36 provided on an associated one of the lift arms 26 at a location above the rear end of the housing 22. A roller 38 is mounted on the upper end of the link 36. A second link 40 has one end pivotally connected to the lower end of the link 36 and another end pivotally connected to a lug 42 provided on the rear end of the housing 22. As viewed in FIG. 1, it can be seen that the roller 38 is disposed adjacent to the inclined surface 18 of the frame 12 when the mower is in its working position. Upon the lift actuators 28 being operated to swing the lift arms 26 upwardly about their connections with the frame 12, the roller 38 immediately engages the surface 18, and continuted upward movement of the associated lift arm results in the link 34 pivoting clockwise about its connection with the lift arm so as to act through the link 40 to lift the rear end of the housing 22. The rear end of the housing is then elevated sufficiently to clear obstructions, such as curbs and the like, which may be encountered while driving the tractor 10 to and from an area to be mowed.

I claim:

1. In a vehicle having a rotary mower mounted thereon by at least one lift arm extending between a frame of the vehicle and a central location between front and rear ends of a blade housing of the mower, a lift mechanism for effecting elevation of the rear end of the blade housing in response to upward movement of the lift arm, comprising: a first link pivoted medially of its ends to the lift arm at a location above the rear end of the blade housing; surface means at one end of the first link being disposed beneath and closely adjacent to a surface of said frame when the lift arm is in a lowered position; and a second link having its opposite ends respectively pivotally connected to a second end of the first link and the rear end of the housing whereby raising of the lift arm will cause the one end of the first link to engage the frame surface so as to impart rotation to the first link and effect lifting of the rear end of the housing.

2. The vehicle defined in claim 1 wherein the surface means at the one end of the first link is a roller.

3. The vehicle defined in claim 2 wherein the surface of the frame is inclined so as to increase in elevation from rear to front.

* * * * *